United States Patent
Pritchard et al.

(10) Patent No.: US 10,563,704 B2
(45) Date of Patent: Feb. 18, 2020

(54) LOCKING TRANSFER CASE

(71) Applicant: BorgWarner Inc., Auburn Hills, MI (US)

(72) Inventors: Larry A. Pritchard, Macomb, MI (US); Thaddeus R. Kopp, Jr., Oakland Township, MI (US); Branden L. Reeves, Oxford, MI (US)

(73) Assignee: BorgWarner Inc., Auburn Hills, MI (US)

( * ) Notice: Subject to any disclaimer, the term of this patent is extended or adjusted under 35 U.S.C. 154(b) by 176 days.

(21) Appl. No.: 15/438,814

(22) Filed: Feb. 22, 2017

(65) Prior Publication Data
US 2017/0241486 A1 Aug. 24, 2017

Related U.S. Application Data

(60) Provisional application No. 62/298,416, filed on Feb. 22, 2016.

(51) Int. Cl.
*F16D 23/14* (2006.01)
*B60K 17/02* (2006.01)
(Continued)

(52) U.S. Cl.
CPC .............. *F16D 23/14* (2013.01); *B60K 17/02* (2013.01); *B60K 17/344* (2013.01);
(Continued)

(58) Field of Classification Search
CPC .... B60K 23/08; B60K 17/35; B60K 17/3467; B60K 17/02; B60K 17/344;
(Continued)

(56) References Cited

U.S. PATENT DOCUMENTS 3,063,529 A * 11/1962 Cook ...................... F16D 23/04
192/48.5
3,161,270 A * 12/1964 Aschauer ................ F16D 23/04
192/48.5
(Continued)

FOREIGN PATENT DOCUMENTS

DE 102008037885 A1 3/2010
WO 2012177504 A1 12/2012

*Primary Examiner* — Jacob S. Scott
*Assistant Examiner* — Lillian T Nguyen
(74) *Attorney, Agent, or Firm* — Young Basile Hanlon & MacFarlane, P.C.

(57) ABSTRACT

A transfer case includes a primary output shaft, and a secondary output selectively coupleable to the primary output shaft with a secondary torque transfer mechanism. The secondary torque transfer mechanism comprises a plate clutch and a locking sleeve. The plate clutch includes a housing coupled to the secondary output shaft, a plurality of interleaved plates alternatingly coupled to the primary output shaft and the housing, and an apply plate coupled to the primary output shaft and being configured to compress the interleaved plates to selectively form a friction coupling between the primary output shaft and the secondary output shaft. The locking sleeve is non-selectively coupled to one of the housing or the apply plate to rotate therewith, and is selectively coupleable to the other of the housing or the apply plate to form a positive coupling between the primary output shaft and the secondary output shaft.

20 Claims, 11 Drawing Sheets

(51) Int. Cl.
*B60K 17/344* (2006.01)
*F16D 11/14* (2006.01)
*F16D 13/52* (2006.01)
*F16D 11/10* (2006.01)
*B60K 17/346* (2006.01)
*F16D 23/12* (2006.01)
*B60K 23/08* (2006.01)
*B60K 17/35* (2006.01)
*F16D 11/00* (2006.01)

(52) U.S. Cl.
CPC .......... *B60K 17/3467* (2013.01); *B60K 17/35* (2013.01); *B60K 23/08* (2013.01); *F16D 11/10* (2013.01); *F16D 11/14* (2013.01); *F16D 13/52* (2013.01); *F16D 23/12* (2013.01); *F16D 2011/008* (2013.01); *F16D 2023/123* (2013.01); *F16D 2023/141* (2013.01)

(58) Field of Classification Search
CPC ......... F16D 2023/141; F16D 2023/123; F16D 23/04; F16D 23/06; F16D 23/14; F16D 23/12; F16D 11/10; F16D 11/14; F16D 13/52; F16D 2011/008
See application file for complete search history.

(56) References Cited

U.S. PATENT DOCUMENTS

| | | | |
|---|---|---|---|
| 6,079,535 A * | 6/2000 | Mueller | B60K 17/34 180/247 |
| 9,186,987 B2 | 11/2015 | Mastie et al. | |
| 9,447,873 B2 | 9/2016 | Pritchard | |
| 2004/0163916 A1* | 8/2004 | Showalter | B60K 17/3467 192/48.2 |
| 2005/0040000 A1* | 2/2005 | Kelley, Jr. | F16D 23/04 192/35 |
| 2005/0202919 A1 | 9/2005 | Mueller et al. | |

* cited by examiner

LOCKING TRANSFER CASE

CROSS-REFERENCE TO RELATED APPLICATIONS

This application claims priority to and the benefit of U.S. Provisional Application No. 62/298,416, filed Feb. 22, 2016, the entire disclosure of which is hereby incorporated by reference.

BACKGROUND

In the field of vehicle drivetrain components, a transfer case is an apparatus that distributes driving power to more than one driven axle of the vehicle. A typical transfer case receives driving power from the transmission of the vehicle and transfers that power to a primary output shaft that is driven constantly, for example, during operation of the vehicle in a two-wheel drive mode, and a secondary output shaft that is driven selectively using a clutch, for example, during operation of the vehicle in a four-wheel drive mode. In addition, two-speed transfer cases provide gear reduction to allow operation in a high range, which is typically a 1:1 drive ratio, or a low range, such as a 2:1 drive ratio.

It would be advantageous to provide a transfer case that additionally positively couples the primary output shaft to the secondary output shaft for transferring torque therebetween.

SUMMARY

According to an exemplary embodiment, a transfer case includes a primary output shaft and a secondary output shaft selectively coupleable to the primary output shaft with a secondary torque transfer mechanism to transfer torque between the primary output shaft and the secondary output shaft. The secondary torque transfer mechanism comprises a plate clutch and a locking sleeve. The plate clutch includes a housing, a plurality of interleaved plates, and an apply plate. The housing is coupled to the secondary output shaft to rotate therewith. The interleaved plates are alternatingly coupled to the primary output shaft and the clutch housing to rotate therewith. The apply plate is coupled to the primary output shaft to rotate therewith and is configured to compress the interleaved plates to selectively form a friction coupling between the primary output shaft and the secondary output shaft. The locking sleeve is non-selectively coupled to one of the housing or the apply plate to rotate therewith and is configured to selectively couple to the other of the housing or the apply plate to form a positive coupling between the primary output shaft and the secondary output shaft.

BRIEF DESCRIPTION OF THE DRAWINGS

The description herein makes reference to the accompanying drawings, wherein like referenced numerals refer to like parts throughout several views, and wherein.

DETAILED DESCRIPTION

Figure 1:
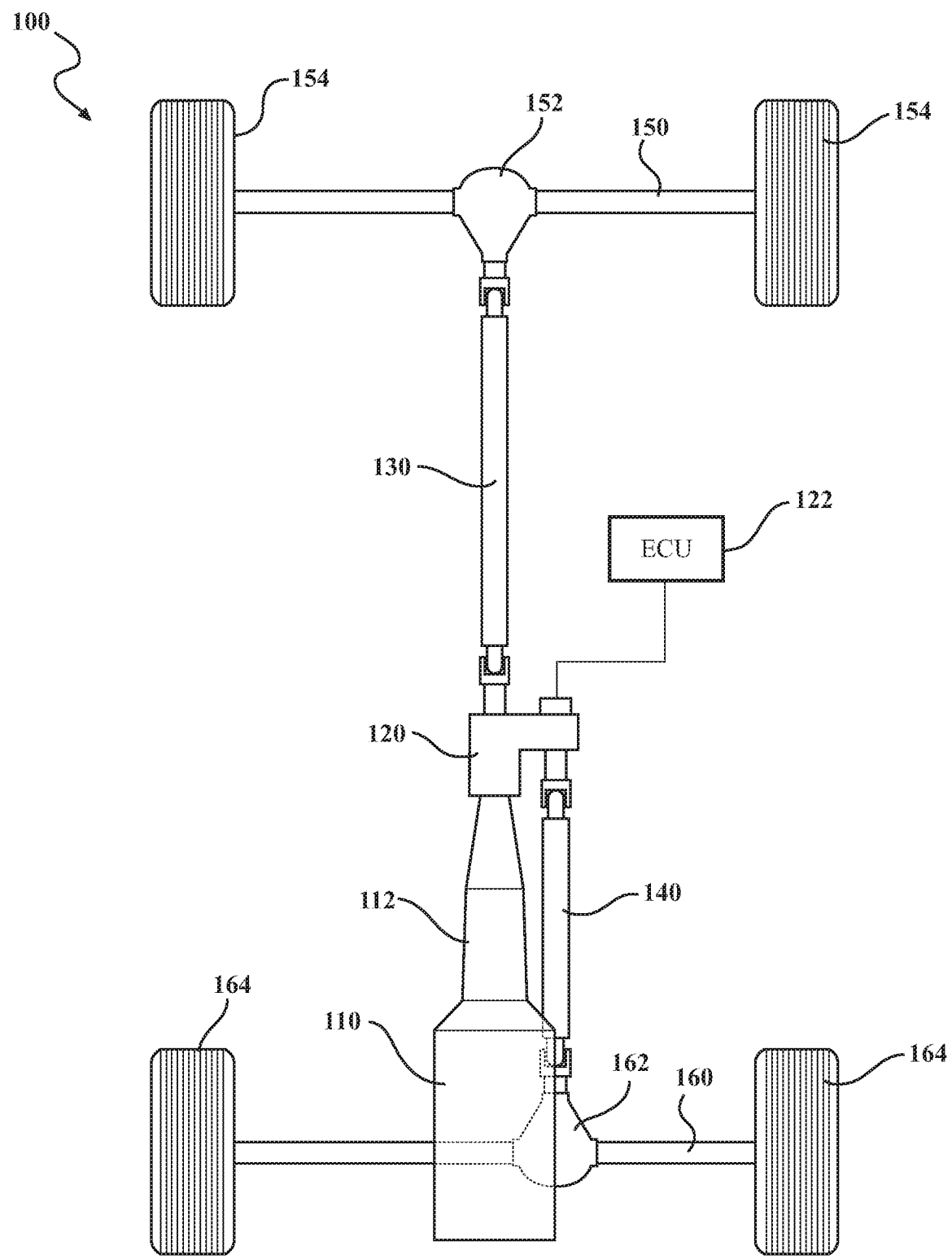
FIG. 1 is a plan view illustration showing a drivetrain that includes a transfer case.

FIG. 1 is a plan view illustration showing a drivetrain 100 for a four-wheel drive vehicle. The drivetrain 100 includes an engine 110 that is coupled to a transmission 112. The engine 110 is the prime mover of the drivetrain 100 and can be, for example, an internal combustion engine, an electric motor/generator, or a combination of the two. Other types of prime movers can be utilized as the engine 110 to provide driving power (e.g. via a rotating output shaft) to the transmission 112. The transmission 112 includes components operable to convert the speed and torque of the driving power provided by the engine 110, such as by a gear train that provides multiple gear ratios. As examples, the transmission 112 can be a manual transmission, an automatic transmission, a semi-automatic transmission, a continuously variable transmission, or a dual clutch transmission.

The transmission 112 provides driving power to a transfer case 120. The transfer case 120 is operable to distribute driving power to a rear driveshaft 130 and a front driveshaft 140. The transfer case 120 can, in some implementations, include components that allow the transfer case 120 to perform a mode shift between two or more different modes. For example, the transfer case 120 can allow operation in a rear-wheel drive or two-wheel drive mode, in which only the rear driveshaft 130 receives driving power and the front driveshaft 140 does not, and a four-wheel drive mode, in which the rear driveshaft 130 and the front driveshaft 140 both receive driving power. In this example, the rear driveshaft 130 is the primary driveshaft, and the front driveshaft 140 is the secondary driveshaft. In other implementations, the front driveshaft 140 is the primary driveshaft, and the rear driveshaft 130 is the secondary driveshaft, wherein the transfer case 120 performs a mode shift between a front-wheel drive mode and a four-wheel drive mode. In other implementations, the transfer case 120 does not include components that allow a mode shift, and the transfer case 120 constantly provides driving power to both the rear driveshaft 130 and the front driveshaft 140.

The transfer case 120 can allow a range shift that selectively provides gear reduction to the rotational output of the transfer case 120. For example, the transfer case 120 can include components for operating in a high range, such as a 1:1 drive ratio, or a low range, such as a 2:1 drive ratio. The range shift changes the transfer case 120 between operation in the low range and the high range by selectively coupling and uncoupling a gear reduction mechanism of the transfer case 120.

Operation of the transfer case 120 can be regulated by a controller such as an ECU 122 that provides signals to components of the transfer case 120 to cause the mode shift and/or the range shift. In other implementations, the mode shift and/or the range shift can be actuated mechanically, such as by a driver-operated lever that is mechanically connected to a component of the transfer case 120.

The rear driveshaft 130 provides driving power to a rear axle 150 via a rear differential 152. The rear axle 150 can be, for example, a solid axle or a pair of independent half axles. The rear axle 150 provides driving power to a pair of rear wheels 154 that are fitted with tires. The front driveshaft 140 provides driving power to a front axle 160 via a front differential 162. The front axle 160 can also be, for example, a solid axle or a pair of independent half axles. The front axle 160 provides driving power to a pair of front wheels 164 that are fitted with tires.

Figure 2:
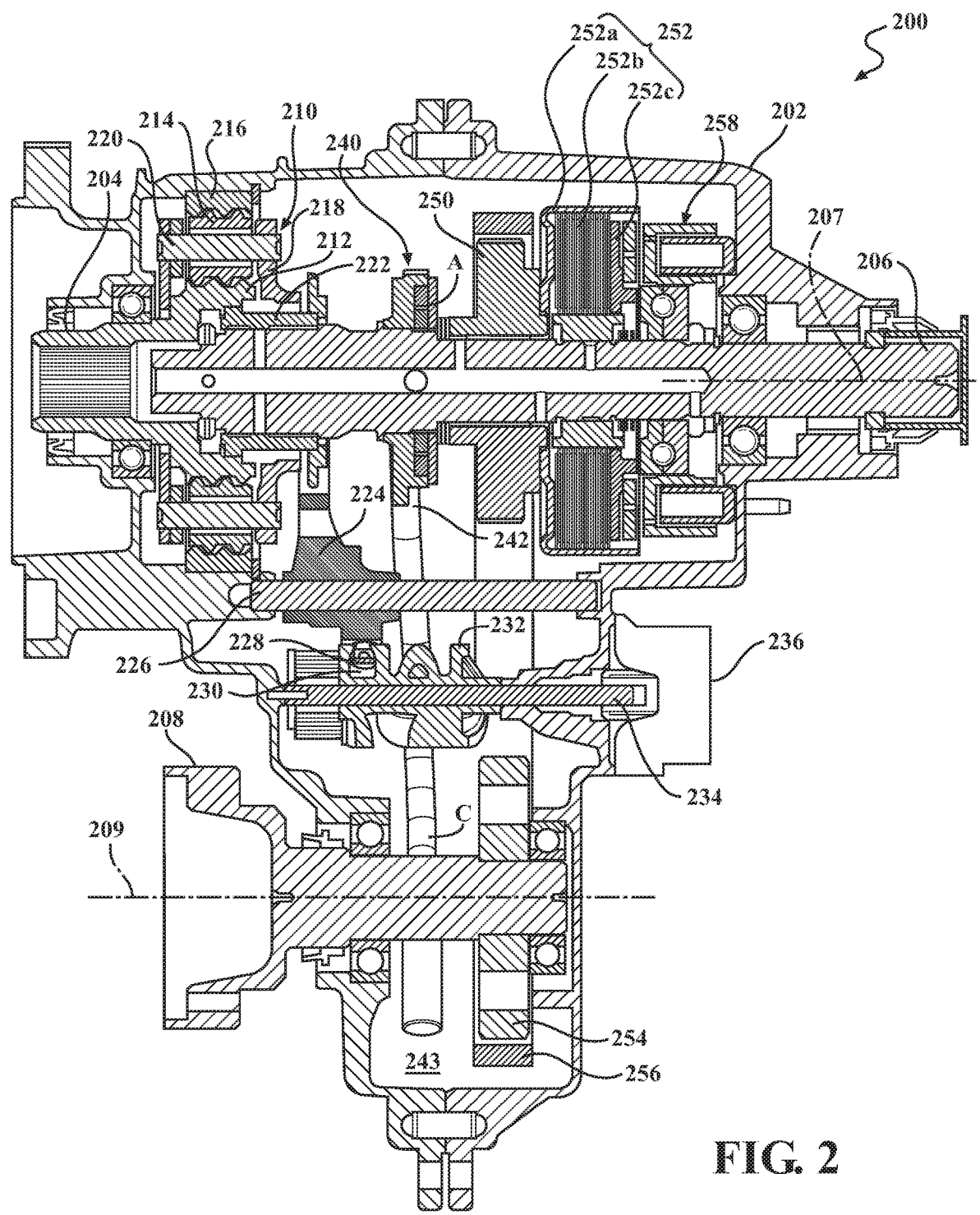
FIG. 2 is a cross-section illustration showing a transfer case having a conventional actuation system.

As shown in FIG. 2, the transfer case 200 generally includes a gear reduction system or mechanism 210 and a secondary torque transfer system or mechanism. The gear reduction system 210 is configured to transfer torque selectively at different drive ratios from an input shaft 204 to a primary output shaft 206 and is operable by a reduction actuation mechanism. The secondary torque transfer system is configured to selectively transfer torque between the primary output shaft 206 (e.g., the rear output shaft or driveshaft 130) and a secondary output shaft 208 (e.g., the front output shaft or driveshaft 140), and is operable by a torque transfer actuation mechanism. In the discussion that follows, directional terminology (e.g., front, forward, back, rearward, etc.), though referring to an orientation in which the transfer case 200 might may be installed in a vehicle (e.g., in the cross-sections shown in FIGS. 2 and 3, the left side is the front of the transfer case 200, while the right side is the rear of the transfer case 200), such directional terminology is for reference only, as other mounting orientations of the transfer case 200 and other transfer cases discussed below are possible.

The transfer case 200 includes a housing 202 and rotating components including the input shaft 204, the primary output shaft 206, and the secondary output shaft 208 that each extend out of the housing 202. The input shaft 204 and the primary output shaft 206 extend along a first axis 207. The secondary output shaft 208 extends along a second axis 209 which is, in this example, parallel to the first axis 207. Together, the input shaft 204, the primary output shaft 206, and the secondary output shaft 208 form a power transfer assembly.

The input shaft 204 is at least partially hollow, and the primary output shaft 206 extends into the hollow interior of the input shaft 204. The input shaft 204 can be connected to the primary output shaft 206 either directly or via a gear reduction mechanism 210. The gear reduction mechanism 210 can be a Ravigneaux planetary gearset that includes a sun gear 212 formed on the input shaft 204, a plurality of planet gears 214, and a ring gear 216 that is fixed to the housing 202. A planet carrier 218 is arranged on the input shaft 204 and can rotate about the input shaft 204. The planet gears 214 are arranged on stub shafts 220 that are connected to the planet carrier 218. The planet gears 214 mesh with the sun gear 212 and the ring gear 216.

A dog clutch mechanism having a gear reduction hub 222 (e.g., dog clutch, coupling, ring) is utilized to engage and disengage the gear reduction mechanism 210. In a first position, the gear reduction hub 222 is positioned axially forward (i.e., parallel with the primary output shaft 206) to engage the input shaft 204 and the primary output shaft 206 directly, which establishes a 1:1 drive ratio and does not utilize the gear reduction mechanism 210. In a second position of the gear reduction hub 222 (not shown), the gear reduction hub 222 is shifted axially rearward away from the input shaft 204, and instead engages the planet carrier 218 and the primary output shaft 206. Driving power is thus routed through the gear reduction mechanism 210, with the planet carrier 218 rotating slower than the input shaft 204 to establish a drive ratio such as 2:1.

The reduction actuation mechanism moves the gear reduction hub 222 between its first and second positions. In particular, the gear reduction hub 222 is moved by a first selector fork 224 which moves forward and rearward axially along a selector shaft 226. A first cam follower 228 is formed on the first selector fork 224. The first cam follower 228 is disposed in a first groove 230 formed on an exterior surface of a barrel cam 232. The barrel cam 232 is disposed on a rotatable shaft 234 that is rotated by an electric motor 236 in response to control signals from a controller such as the ECU 122 of FIG. 1.

The secondary torque transfer mechanism is configured to transfer torque from the primary output shaft 206 to the secondary output shaft 208. A first sprocket 250 (e.g., rotating member) is arranged on the primary output shaft 206 and connected to the primary output shaft 206 by a plate clutch 252. The second sprocket 254 is arranged on the secondary output shaft 208 and is connected thereto for rotation in unison, such as by splines (not shown). The first sprocket 250 and the second sprocket 254 are connected by a chain 256, such that the secondary output shaft 208 is driven by the primary output shaft 206 via the first sprocket 250, the chain 256, and the second sprocket 254 when the clutch 252 is engaged.

The plate clutch 252 generally includes a housing 252a (e.g., drum), a plurality of interleaved plates 252b, a pressure or apply plate 252c, and an actuator 258. The housing 252a generally includes a radial base through which the primary output shaft 206 extends, and a concentric or annular flange extending axially away from an outer periphery of the base to form the housing 252a, which is generally cylindrical and in which the interleaved plates 252b are positioned. The base of the housing 252a is fixedly coupled to the first sprocket 250 to cause rotation thereof, while the apply plate 252c is coupled to the primary output shaft 206 (e.g., through a splined connection) to rotate therewith and slide therealong. The interleaved plates 252b alternate between being engaged (e.g., splined) with the primary output shaft 206 and an inner periphery of the housing 252a. The actuator 258 is configured to press on the apply plate 252c, so as to compress the interleaved plates 252b between the apply plate 252c and the base of the housing 252a, so as to increase friction therebetween and transfer torque between the interleaved plates 252b splined with primary output shaft 206 and the interleaved plates 252b splined with the housing 252a. In this manner, torque may be selectively transferred from the primary output shaft 206 to the first sprocket 250 and ultimately the secondary output shaft 208.

Figure 3:
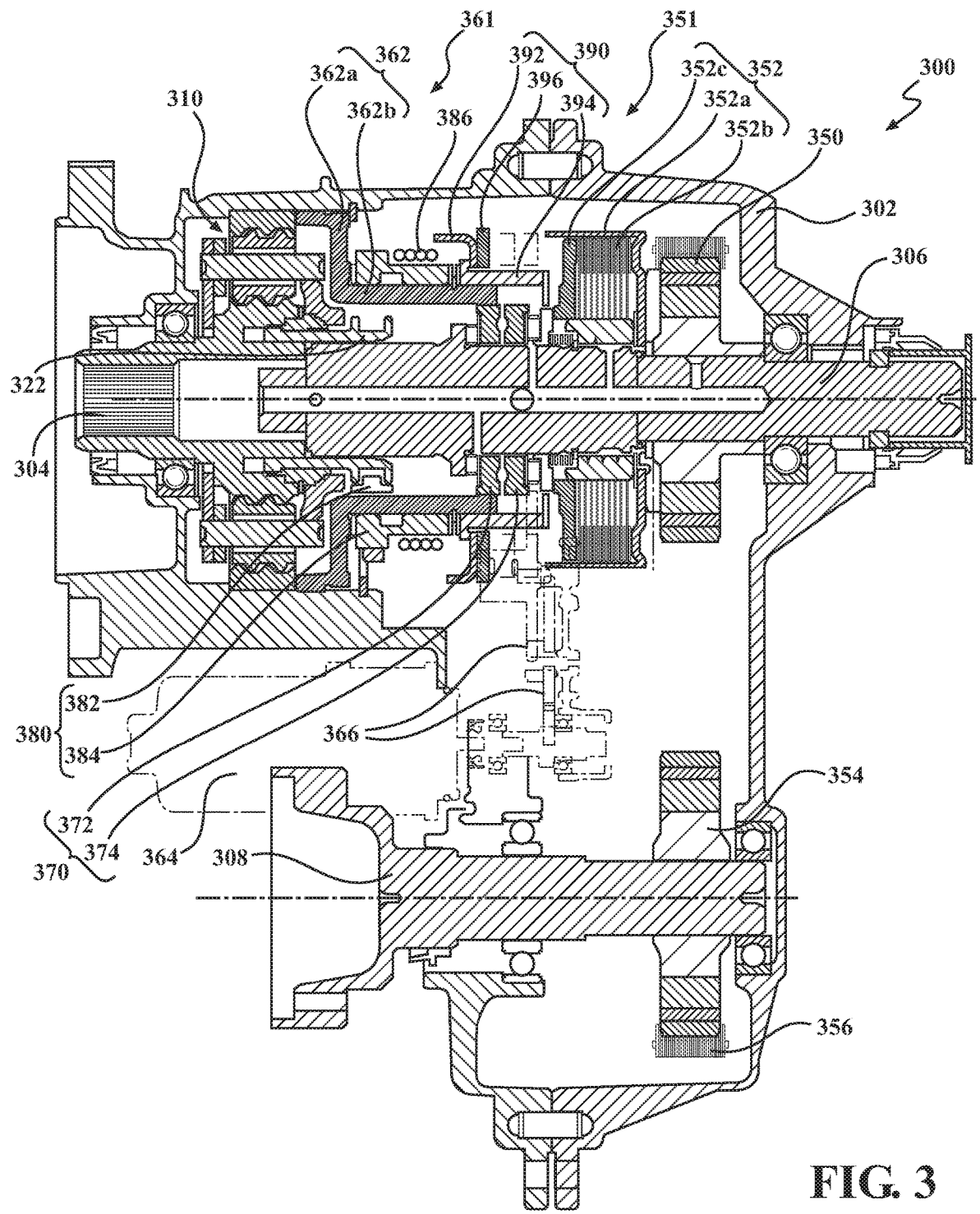
FIG. 3 is a cross-section illustration showing a transfer case having an actuation system according to an exemplary embodiment.
Figure 4:
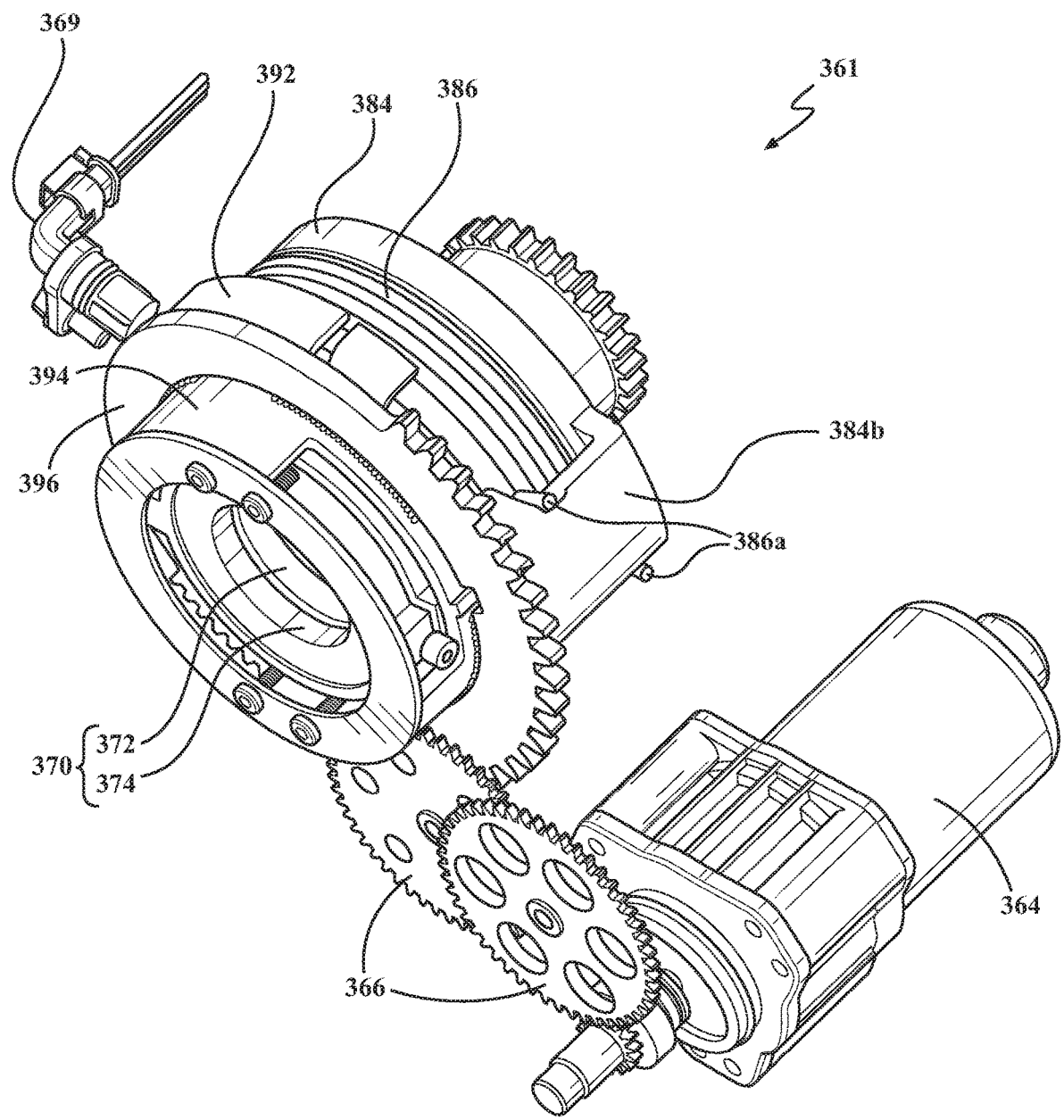
FIG. 4 is a rear perspective view of the actuation system.
Figure 5:
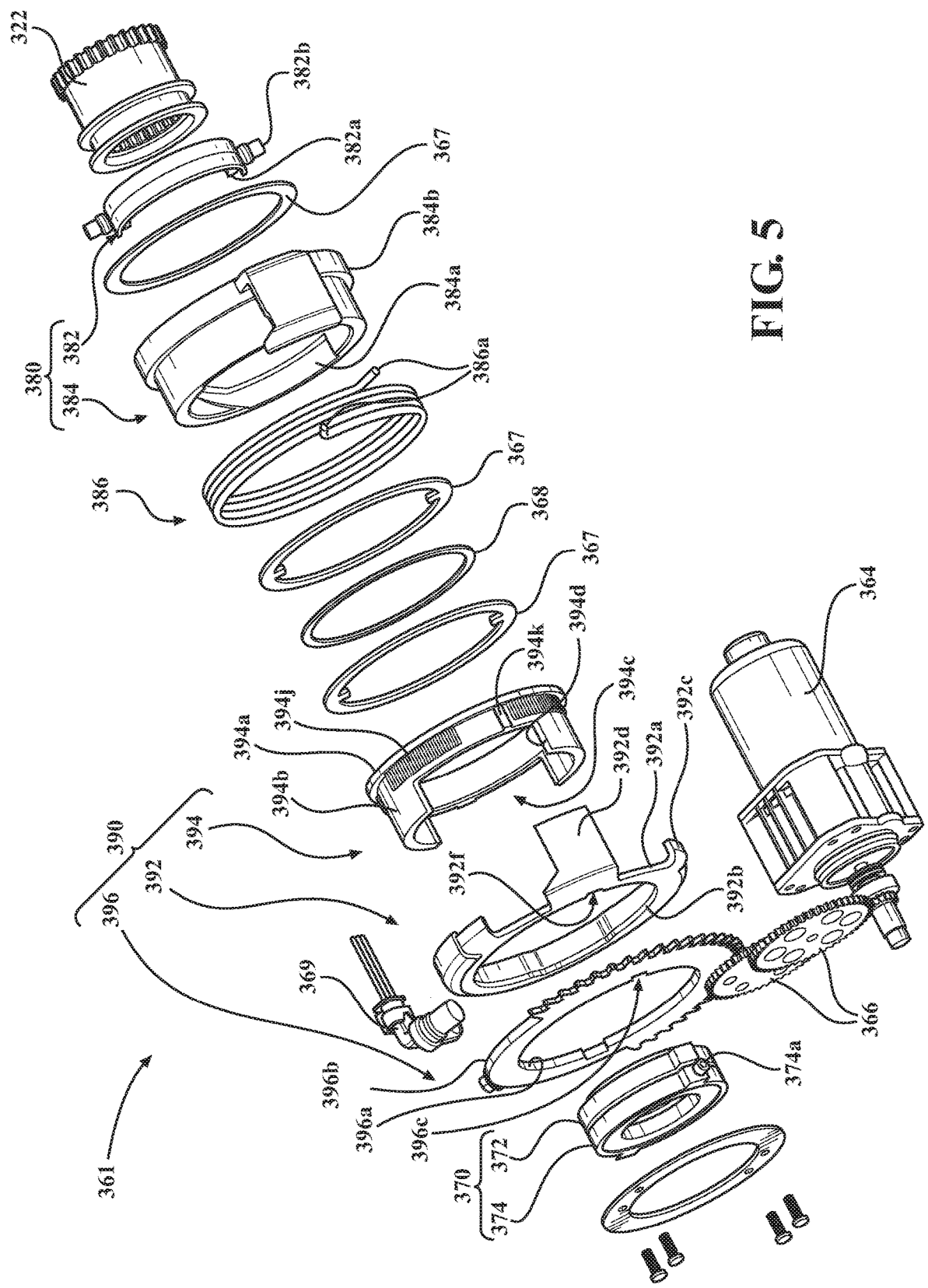
FIG. 5 is an exploded view of the actuation system.

FIG. 3 is a cross-sectional illustration showing the transfer case 300, while FIGS. 4-5 depict an actuation system 361 of the transfer case 300 in isolation. The transfer case 300 generally includes a gear reduction mechanism 310 and a secondary torque transfer mechanism 351, which include similar components (not all shown or labeled in the cross-sectional view of FIG. 3) and functionality of the gear reduction mechanism 210 and secondary torque transfer mechanism discussed previously, along with an actuation system 361 (e.g., actuator or actuation mechanism) that functions to operate both the gear reduction mechanism 310 and the secondary torque transfer mechanism 351. Components and assemblies of the transfer case 300, having generally the same and/or similar function as those of the transfer case 200, are generally described with common naming and numbering increasing by 100 (e.g., gear reduction mechanism 210 and gear reduction mechanism 310) across different embodiments.

As compared to the transfer case 200, the orientation of the plate clutch 352 and sprocket 350 of the secondary torque transfer mechanism 351 are reversed front to rear with the plate clutch 352 having its apply plate 352c facing forward, and the plate clutch 352 itself being disposed forward of the sprocket 350. The actuation system 361 is generally positioned axially between the gear reduction mechanism 310 and the plate clutch 352. The actuation system 361 engages the reduction hub 322 to operate the gear reduction mechanism 310 and is further configured to engage the apply plate 352c of the plate clutch 352 to operate the secondary torque transfer mechanism 351.

As shown in FIGS. 4-5, the actuation system 361 generally includes an actuator base 362, a motor 364 with reduction gears 366, a secondary torque transfer actuator mechanism 370 (e.g., plate clutch actuator, first actuator mechanism), a gear reduction actuator mechanism 380 (e.g., dog clutch actuator, second actuator mechanism), and a drive gear assembly 390 (e.g., drive assembly). Generally speaking, the motor 364, by way of the reduction gears 366, rotates the drive gear assembly 390, which, in turn, causes sequential (i.e., serial, staged) operation of the gear reduction actuator mechanism 380 and the torque transfer actuator mechanism 370, each stage of rotation generally being associated with one of the actuator mechanisms 370, 380. For example, a first stage is associated with the gear reduction actuator mechanism 380. In the first stage (e.g., first or initial range of motion or rotation; first positive stage and first negative stage), the drive gear assembly 390 is rotated (e.g., +/−between 30 and 50 degrees from center, such as 35 degrees) by the motor 364 via the reduction gears 366 to operate the gear reduction actuator mechanism 380, which moves the gear reduction hub 322 (e.g., coupling) into the first position (e.g., high range at +35 degrees) or the second position (e.g., low range at −35 degrees). In a second stage (e.g., second, continued, or subsequent range of motion or rotation from ends of the first stage; second positive stage, and second negative stage), the drive gear assembly 390 is further rotated (e.g., +/−an additional 10-30 degrees, such as 25 degrees, meaning +35 degrees to +60 degrees and −35 degrees to −60 degrees) by the motor 364 to operate the secondary torque transfer actuator mechanism 370, which presses the clutch apply plate 352c to compress the interleaved plates 352b within the clutch housing 352a. As discussed in further detail below, the torque transfer actuator mechanism 370 and gear reduction actuator mechanism 380 each include cam mechanisms, which include advance and/or retreat movement regions and/or dwell regions that, in conjunction with the drive gear assembly 390, provided for the staged operation.

According to other exemplary embodiments, the various stages of operation of the actuator system 361 may be configured differently, for example, with different ranges of motion in the first and/or second stage (i.e., greater or lesser), different bidirectional ranges for each direction of motion within a given stage (e.g., +35 degrees in the first positive stage, and −25 degrees in the first negative stage), overlapping ranges of motion between stages (e.g., +/−35 degrees in the first stage, and +30 to +60 and −30 to −60 in the second positive and negative stages), with gaps between the ranges of motion (e.g., +/−30 degrees in the first stage, and +35 to +60 and −35 to −60 in the second positive and negative stages), with additional stages (e.g., to operate other actuator mechanisms), and/or with unidirectional stages associated with one or more of the actuator mechanisms (e.g., rotation in only one direction causes the actuator mechanism to operate).

As seen in FIG. 3, the actuator base 362 is a generally rigid, stationary member that fixedly couples the actuator system 361 (e.g., actuator system or mechanism) to the housing 302 of the transfer case 300. The actuator base 362 generally includes a base portion 362a (e.g., a forward or radially outer portion), which couples to the housing 302 of the transfer case 300 proximate the gear reduction mechanism 310, for example, with a thrust washer, an interference fit, and/or other fasteners. The actuator base 362 also includes a generally cylindrical body or body portion 362b (e.g., a radially inner or annular portion or stem), which extends rearward axially away from the actuator base portion 362a toward the plate clutch 352. The actuator base 362 includes a central bore (not labeled) through which the primary output shaft 306 extends. Other components of the actuation system 361 are fixedly or movably coupled to the body portion 362b as discussed below.

As seen in FIGS. 3-5, the motor 364, by way of the reduction gears 366, is configured to rotate the drive gear assembly 390 about the actuator base 362, which in turn causes the secondary torque transfer actuator mechanism 370 to operate the plate clutch 352 and causes the gear reduction actuator mechanism 380 to move the gear reduction hub 322. The motor 364 is fixedly coupled to, and the reduction gears 366 are rotatably coupled to the housing 302 at positions located radially outward of the primary output shaft 306.

The gear reduction actuator mechanism 380 functions as a cylindrical or barrel cam mechanism, which moves the gear reduction hub 322 between the first and second positions during the first stage (e.g., initial rotation of the drive gear assembly 390 from a center). The gear reduction actuator mechanism 380 includes a shift fork 382 and a barrel 384 (e.g., shift cam). With rotation, the barrel 384 is configured to displace the shift fork 382 forward and rearward axially within the transfer case 300, so as to move the gear reduction hub 322 between the first or forward position (i.e., in which the gear reduction hub 322 directly couples input shaft 304 and the primary output shaft 306; establishing the high range) and the second or rearward position (i.e., in which the gear reduction hub 322 couples the input shaft 304 and the primary output shaft 306 by way of the gear reduction mechanism 310; establishing the low range).

The shift fork 382 is a generally arcuate member positioned substantially within the central bore of the body portion 362b of the actuator base 362 and radially outward of the primary output shaft 306. The shift fork 382 is generally semicircular having an inner flange 382a that extends radially inward from an inner peripheral surface of the shift fork 382. The inner flange 382a is positioned between and engages radially outwardly extending, peripheral flanges of the gear reduction hub 322, such that axial movement of the shift fork 382 moves the gear reduction hub 322 axially between the first and second positions.

The shift fork 382 also includes two followers 382b configured as rollers, each extending radially outward from the outer peripheral surface of the shift fork 382 through an axially extending slot (not shown) in the body portion 362b of the actuator base 362 to be engaged by the barrel 384 (discussed below). The axially extending slot of the body portion 362b of the actuator base 362 maintains the shift fork 382 in a constant rotational position relative to the actuator base 362, while allowing the shift fork 382 to translate axially. The two followers 382b are positioned substantially opposite each other (i.e., approximately 180 degrees apart) at, or proximate to, ends of the shift fork 382. Each follower 382b is coupled to and rotates about an axle (not labeled), which extends substantially radially outward from ends of the shift fork 382 (e.g., perpendicular to the outer peripheral surface). The shift fork 382 may additionally include a boss or protrusion for each follower 382b extending radially outward from the outer peripheral surface to which the axle is coupled.

The barrel 384 is a generally cylindrical member that surrounds the body portion 362b of the actuator base 362 and is configured to rotate thereabout to axially move the shift fork 382. The barrel 384 includes an inner peripheral surface that bears against an outer peripheral surface of the body portion 362b of the actuator base 362. One or more thrust washers 367 and/or snap clips 368 are coupled to the outer periphery of the body portion 362b at an intermediate axial location thereof, as well as adjacent the base portion 362a. As the barrel 384 rotates about the body portion 362b of the actuator base 362, edges of the barrel 384 may slide and bear against the thrust washers 367 to transfer an axial force for moving the gear reduction hub 322 relative to the actuator base 362 forward and rearward.

The barrel 384 includes an inner cam slot 384a configured to engage and axially move the shift fork 382 and, thereby, move the gear reduction hub 322 between the first and second positions. Each cam slot 384a extends radially outward from the inner peripheral surface of the barrel 384 with one of the followers 382b of the shift fork 382 being positioned in each cam slot 384a. Each cam slot 384a includes a movement region having opposed helically ramped surfaces that engage the follower 382b during the first movement stage (i.e., initial rotation of the barrel 384 and drive gear assembly 390 from center) to move the shift fork 382 axially forward and rearward. The movement region is flanked by dwell or flat regions in which the cam slot 384a maintains the follower 382b in a generally fixed axial position in the second movement stage (e.g., continued positive and negative rotation from respective ends of the first positive stage and the first negative stage) and any subsequent movement.

In order to rotate the barrel 384, the barrel 384 includes an outer radial flange or member 384b, which is positioned radially outward of an outer peripheral surface of the barrel 384 and extends axially rearward from a forward end of the barrel 384. The outer radial member 384b is engaged by a torsion spring 386, which transfers torque from the drive gear assembly 390 to rotate the barrel 384. More particularly, the torsion spring 386 is positioned between the outer peripheral surface of the barrel 384 and the outer radial member 384b and is wound about and bears against the outer peripheral surface of the barrel 384. The torsion spring 386 includes two ends 386a that extend radially outward to engage axially-extending edges of the outer radial member 384b and to engage the drive gear assembly 390 to transfer torque therebetween. In the case of a blocked shift event (i.e., when splines of the reduction hub 322 engage ends of splines of the input shaft 304 or planet carrier (not shown, refer to gear reduction mechanism 210 above) of the gear reduction mechanism 310), the torsion spring 386 allows for relative rotational motion between the barrel 384 and the drive gear assembly 390, while storing energy that causes axial movement of the reduction hub 322 once properly aligned with the input shaft or gear reduction mechanism 310.

The secondary torque transfer actuator mechanism 370 functions as a face cam mechanism (e.g., is a face cam, such as a ball ramp mechanism) to convert continued rotation of the drive gear assembly 390 into axial movement for operating the plate clutch 352 within the second stage of rotational movement (e.g., continued rotation from approximately ends of the first stage). The secondary torque transfer actuator mechanism 370 includes a forward member 372 (e.g., first plate or ring) and a rearward member 374 (e.g., second plate or ring), which are configured for relative rotation therebetween and resultant relative axial displacement for engaging the plate clutch 352. Both the forward member 372 and the rearward member 374 include central apertures or bores through which the primary output shaft 306 extends. The forward member 372 is coupled to a rearward end of the body portion 362b of the actuator base 362, while the rearward member 374 is configured to both rotate and move axially relative to the forward member 372 thereby moving the actuator base 362. For example, as shown, the forward member 372 is positioned within the central bore extending through the body portion 362b of the actuator base 362 and may be coupled thereto by a press-fit, interference fit, or splined connection. The forward member 372 is positioned against a bearing member coupled to the output shaft 306 to prevent forward axial movement thereof. The rearward member 374 is configured to be rotated by the drive gear assembly 390 relative to the forward member 372, as discussed in further detail below, and is positioned to press the apply plate 352c via an intermediate bearing. The intermediate bearing allows the apply plate 352c to spin with the output shaft 306 independent of the rearward member 374, which rotates back and forth within a limited range of motion of the second stage.

At least one of the forward member 372 or rearward member 374 includes an inner surface (i.e., facing the other plate; not shown) that includes two movement advance regions that are helically ramped in opposite directions. Each of a plurality of followers or rollers (e.g., balls) bear against the inner surfaces of both members 372, 374, such that rotation of the rearward member 374 from a center causes the rearward member 374 to displace axially rearward to engage the apply plate 352c of the plate clutch 352 and, thereby, operate the secondary torque transfer mechanism 351. As discussed below, the drive gear assembly 390 is configured to not engage the followers 374a during the first movement stage (e.g., initial rotation of the drive gear assembly 390 from center), so as to not operate the secondary torque transfer actuator mechanism 370. However, the forward and rearward members 372, 374 may instead or additionally include dwell regions for the first movement stage in which rotation does not cause axial movement of the rearward member 374 and/or any subsequent movement stage.

In order to rotate the rearward member 374 relative to the forward member 372, the rearward member 374 is configured to receive application of one or more tangential forces from the drive gear assembly 390 (discussed in further detail below). The rearward member 374 includes one or more followers 374a configured as rollers extending radially outward from a periphery of the rearward member 374. For example, the rearward member 374 may include two followers 374a that are positioned substantially opposite each other (i.e., approximately 180 degrees apart). Each follower 374a is coupled to and rotates about an axle (not labeled), which extends radially from the periphery of the rearward member 374 (e.g., perpendicular to an outer surface thereof). The rearward member 374 may additionally include a boss or protrusion for each follower 374a extending radially outward from the periphery of the rearward member 374 to which the axle and follower 374a are coupled.

As mentioned previously, the drive gear assembly 390 is configured to be rotated by the motor 364 via the reduction gears 366 in order to operate the secondary torque transfer actuator mechanism 370 and the gear reduction actuator mechanism 380. The drive gear assembly 390 generally includes a sense plate 392 (e.g., a first plate), a hub 394, and a gear plate 396 (e.g., a second plate), which are fixedly coupled to each other to be rotated in unison by the motor 364. When the motor 364 drives the gear plate 396 by way of the reduction gears 366, the hub 394 engages the followers 374a to operate the secondary torque transfer actuator mechanism 370, and the sense plate 392 engages the torsion spring 386 to operate the gear reduction actuator mechanism 380. The drive gear assembly 390 is positioned about the actuator base 362 with an inner peripheral surface of the hub 394 bearing on the outer peripheral surface of the body portion 362b of the actuator base 362. The drive gear assembly 390 is held axially on the actuator base 362 between one of the thrust washers 367 and an end plate coupled to the body portion 362b of the base 362. While the drive gear assembly 390 may alternatively be provided as a single component or two primary components, an assembly of the sense plate 392, the hub 394, and the gear plate 396 may provide for less complicated manufacturing, while allowing each component to be configured individually (e.g., to optimize material type according to strength, weight, and cost considerations).

The gear plate 396 is configured to receive an input torque from the motor 364 via the reduction gears 366 through a first movement stage, second movement stage, and any subsequent movement stages of the drive gear assembly 390. The gear plate 396 is a unitary, generally planar member having a central bore or aperture defined by an inner periphery 396a and an outer periphery 396b. The primary output shaft 306, along with other components of the actuator system 361, extends through the central aperture of the gear plate 396. The outer periphery 396b of the gear plate 396 includes a plurality of teeth that mesh with mating teeth of the reduction gears 366, so as to be rotated by the motor 364. Because the actuator system 361 operates within a limited range of rotational motion in the first and second movement stages (e.g., +1–60 degrees), as described above for operating both the secondary torque transfer actuator mechanism 370 and the gear reduction actuator mechanism 380, only a portion of the outer periphery 396b (e.g., 180 degrees) may include teeth. The gear plate 396 may, for example, be made from powdered metal steel and, as discussed in further detail below, may include various features to facilitate coupling to the sense plate 392 and/or the hub 394.

The sense plate 392 is configured to be driven by the gear plate 396 for operating the gear reduction actuator mechanism 380. The sense plate 392 may also be configured with a position sensor 369 for monitoring the rotational position of the actuator system 361. The sense plate 392 is a unitary member, which generally includes a planar portion 392a with a central bore or aperture defined by an inner periphery 392b and also includes first and second annular flanges 392c, 392d, which extend forward axially from an outer periphery of the planar portion 392a. In the drive gear assembly 390, the planar portion 392a is positioned forward of and adjacent to a forward surface of the gear plate 396. The first flange 392c extends substantially circumferentially (e.g., approximately 270 degrees) about the outer periphery of the planar portion 392a. The second flange 392d is configured relative to the outer radial member 384b of the barrel 384 to transfer torque therebetween via the torsion spring 386. More particularly, the second flange 392d is positioned between the circumferential ends of the first flange 392c and has a width that is complementary to the width of the outer radial member 384b of the barrel 384, such that both the outer radial member 384b of the barrel cam 384 and the second flange 392d of the sense plate 392 are positioned between and engaged by the ends 386a of the torsion spring 386. The second flange 392d is additionally, positioned radially between the coil of the torsion spring 386 and the outer radial member 384b of the barrel cam 384. The sense plate 392 may, for example, be made from powdered metal steel, aluminum, polymers or composites, etc. and, as discussed in further detail below, may include various features to facilitate coupling to the hub 394 and/or gear plate 396.

The hub 394 is configured to be driven by the gear plate 396 to operate the secondary torque transfer actuator mechanism 370, for example, in limited ranges of motion of the drive gear assembly 390. During the first movement stage (e.g., initial rotation from center in which the secondary torque transfer actuator mechanism 370 moves the gear reduction hub 322, as discussed previously), the hub 394 rotates freely of the secondary torque transfer actuator mechanism 370, so as to not engage the plate clutch 352. During continued rotation in the second movement stage (e.g., continued positive and negative rotation from respective ends of the first stage), the hub 394 engages the secondary torque transfer actuator mechanism 370.

The hub 394 is a unitary member, which generally includes a base portion 394a (e.g., radial flange) with a central aperture, and includes an annular body 394b extending axially from an inner periphery of the base portion 394a, which rotates about and bears against the body portion 362b of the actuator base 362. As part of the drive gear assembly 390, the annular body 394b extends rearward through the central apertures of the sense plate 392 and the gear plate 396 with the sense plate 392 being held between the base portion 394a of the hub 394 and the gear plate 396. The hub 394 may, for example, be made from powdered metal steel, aluminum, polymers or composites, etc. and, as discussed in further detail below, may include various features to facilitate coupling to the sense plate 392 and/or the gear plate 396.

The hub 394 additionally defines slots 394c (e.g., cutouts) in the annular body 394b in which the followers 374a of the secondary torque transfer actuator mechanism 370 are positioned. Each slot 394c is defined between two circumferentially opposing end walls 394d (e.g., tracks) of the annular body 394b, which extend axially rearward. The slots 394c are sized equally and are circumferentially spaced according to spacing of the followers 374a to provide simultaneous engagement of the followers 374a during rotation of the drive gear assembly 390. During the first movement stage, the followers 374a each remain in a middle region of the slot 394c between the opposed end walls 394d. With continued rotation in the second movement stage, each of two end walls 394d, one from each slot 394c, simultaneously engage and apply a tangential force to one of the followers 374a to rotate the rearward member 374 of the secondary torque transfer actuator mechanism 370. With this rotation, the rearward member 374 displaces axially rearward from the forward member 372, while the followers 374a roll rearward along the opposed end walls 394d. The end walls 394d have an axial length allowing the followers 374a to travel thereon through the full range of axial displacement of the secondary torque transfer actuator mechanism 370.

As referenced above, the drive gear assembly 390 includes the sense plate 392, the hub 394, and the gear plate 396, which are fixedly coupled together to rotate in unison as a single unit. According to the embodiment shown in FIGS. 3-5, the sense plate 392, the hub 394, and the gear plate 396 are coupled together via a press-fit, splined arrangement. More particularly, the annular body 394b (e.g., inner peripheral flange) of the hub 394 is configured to be inserted into the central bore of the sense plate 392 and the central bore of the gear plate 396. The diameter of the outer surface of the annular body 394b of the hub 394 nominally has an outer diameter that is slightly smaller than the inner diameters of the inner peripheries 392b and 396a of the sense plate 392 and the gear plate 396, respectively. The annular body 394b includes a plurality of coupling splines 394j extending axially and protruding radially outward from the outer surface of the annular body 394b in one or more regions to tightly engage and couple with the inner peripheries 392b and 396a of the sense plate 392 and the gear plate 396. The coupling splines 394j may, for example, be configured to deform or cut material forming the inner peripheries 392b and 396a as the sense plate 392 and the gear plate 396 are pressed successively onto the annular body 394b of the hub 394. The annular body 394b may additionally include one or more alignment splines 394k extending axially and protruding radially outwardly from the outer surface of the annular body 394b at one or more locations to be received within alignment slots 392f and 396c of the sense plate 392 and the gear plate 396, respectively. During operation, the motor 364, by way of the reduction gears 366, engages and rotates the gear plate 396, which transfers torque to the hub 394 by way of the splined connection, which in turn transfers torque to the sense plate 392 by way of the splined connection.

Figure 6A:
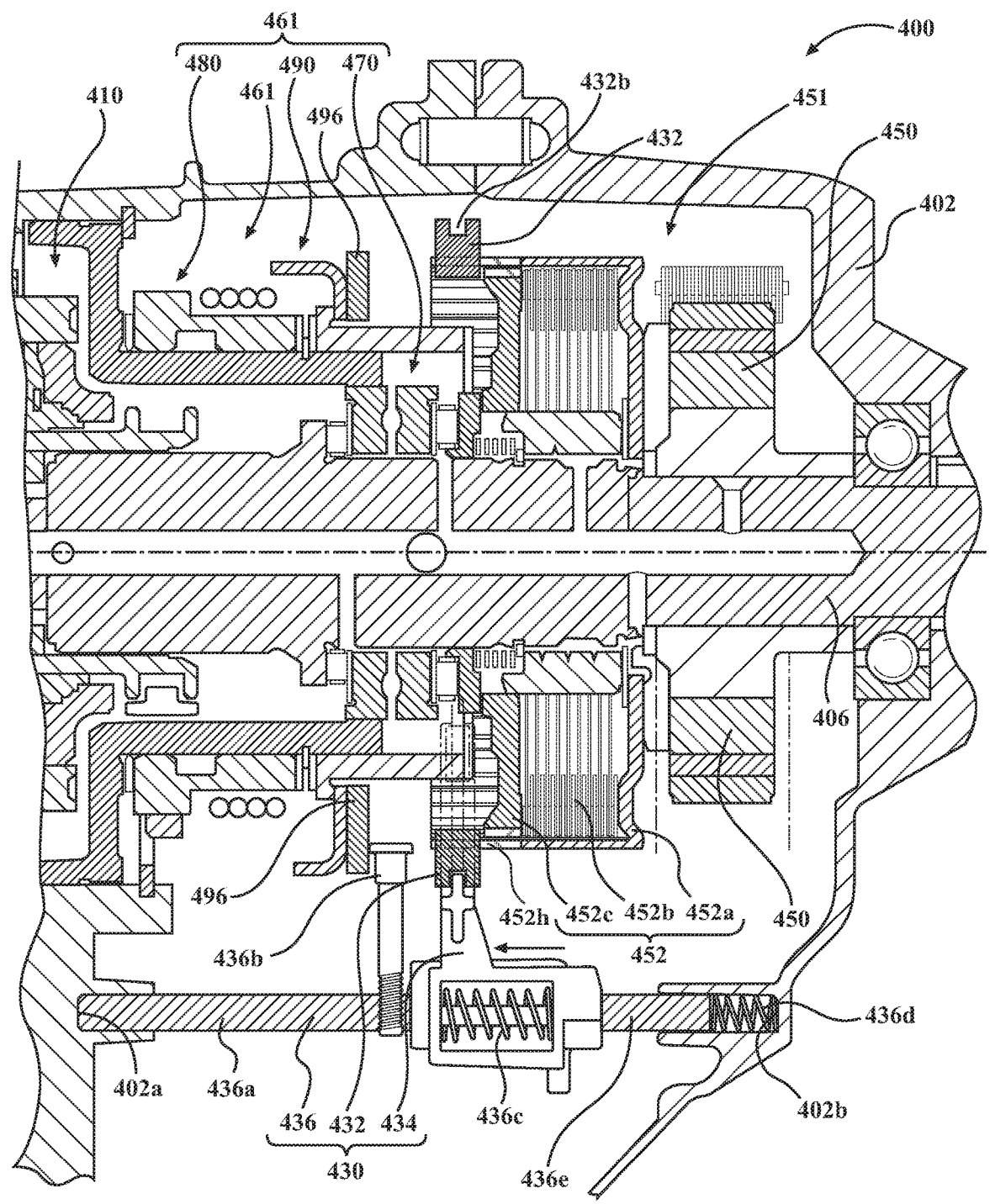
FIG. 6A is a partial cross-sectional view of a transfer case according to another embodiment, which is shown in a first configuration.
Figure 6B:
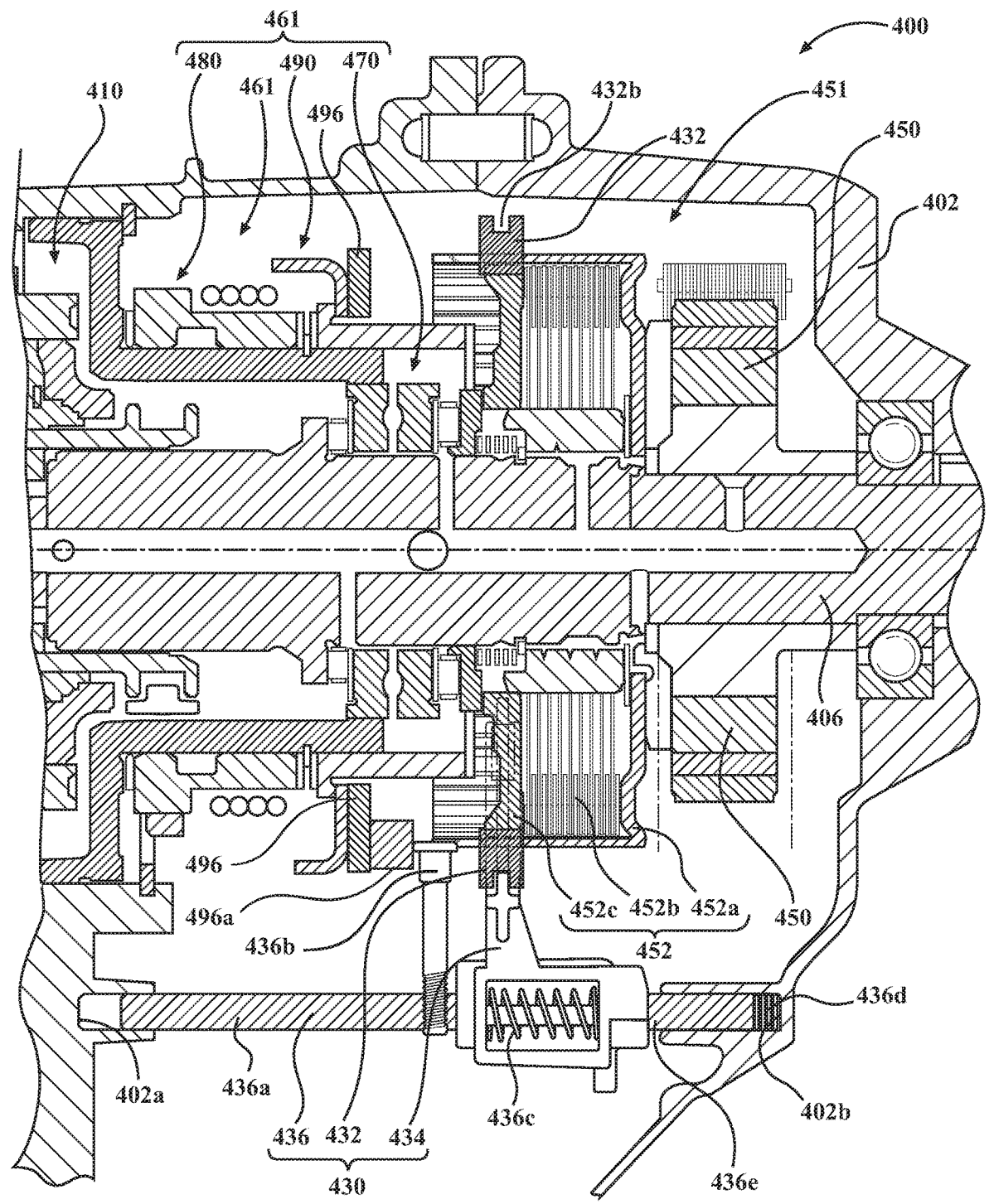
FIG. 6B is a partial cross-sectional view of the transfer case of FIG. 6A shown in a second configuration.
Figure 6C:
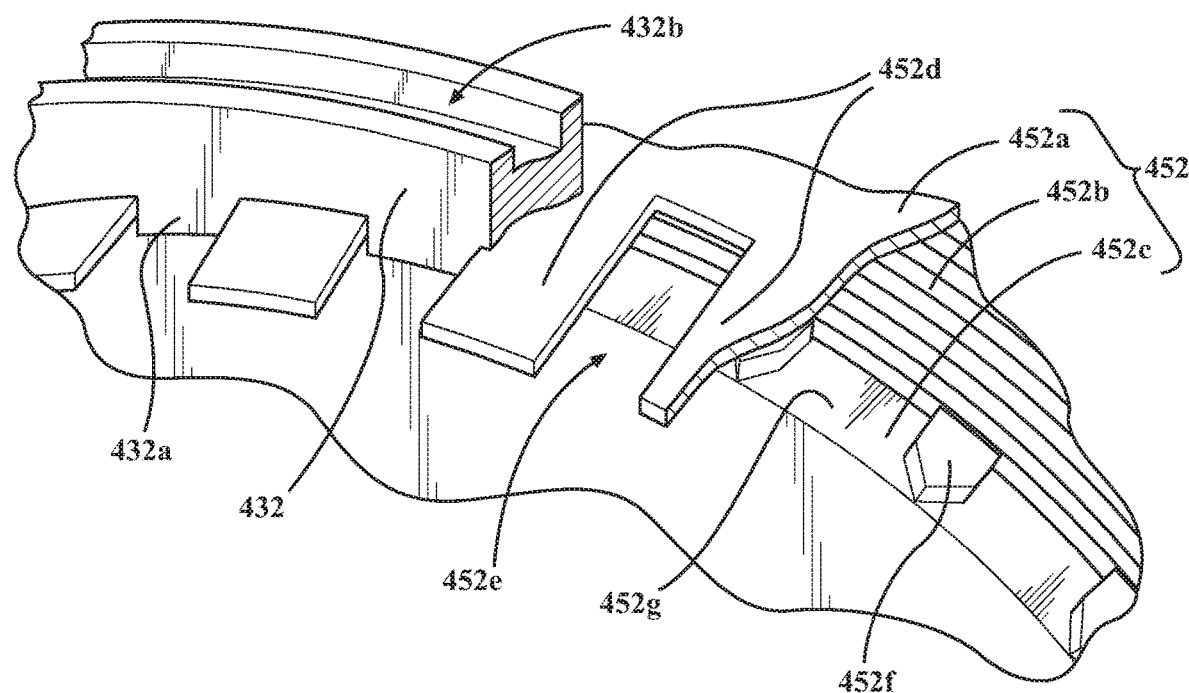
FIG. 6C is a partial perspective view of the transfer case in the configuration shown in FIG. 6B.

According to an exemplary embodiment, as shown in FIGS. 6A-6C, a transfer case 400 is configured similar to the transfer case 300 (described previously), while also including a secondary torque locking mechanism 430 that functions to positively couple a primary output shaft 406 (e.g., primary shaft) to the secondary output shaft (e.g., secondary shaft; not shown; refer to secondary output shaft above). Systems, mechanisms, and components having like structure and/or function are generally referred to with reference numerals increasing by 100 (i.e., 400 as opposed to 300). In particular, a secondary torque transfer mechanism 451 (refer to mechanism 351) includes a plate clutch 452 (refer to plate clutches 252, 352 above) that is configured to frictionally couple the primary output shaft 406 to the secondary output shaft and also includes a locking mechanism 430 for positively coupling (i.e., locking) the primary output shaft 406 to the secondary output shaft. The locking mechanism 430, thereby, provides an alternative or secondary means to the plate clutch 452 for coupling the primary output shaft 406 to the secondary output shaft. The transfer case 400 may also include a gear reduction mechanism 410 (refer to gear reduction mechanisms 210 and 310 above), along with an actuation system 461 (refer to actuation system 361 above) that may be configured to additionally operate the secondary torque locking mechanism 430, as discussed in further detail below. As used herein, the terms "positively couple," "positive coupling," or similar refers to a direct or indirect mechanical connection formed between two components, which is to be distinguished from a friction coupling (e.g., that provided by interleaved plates).

The plate clutch 452 generally includes similar components and operates in a similar manner to the plate clutch 252, 352 described above, but is additionally configured with the locking mechanism 430 to provide the positive coupling between the primary output shaft 406 and the secondary output shaft. The plate clutch 452 generally includes a housing 452a, interleaved plates 452b, and an apply plate 452c, which generally operate as described above for the clutch 352 to form a friction coupling between the primary output shaft 406 and the secondary output shaft. The housing 452a is coupled to and rotates with a sprocket 450 and, ultimately, the secondary output shaft. For example, as with the torque transfer mechanism 351, the secondary output shaft may include another sprocket that is connected to the sprocket 450 with a chain (refer to the discussion of the torque transfer mechanism 351 above, including the sprocket 354 and the chain 356). The apply plate 452c is coupled to and rotates with the primary output shaft 406 (e.g., via a sliding splined connection). The interleaved plates 452b are alternatingly coupled to the primary output shaft 406 and the housing 452a to rotate therewith. The interleaved plates 452b are selectively compressible by the apply plate 452c to form a friction coupling between the primary output shaft 406 and the housing 452a via the interleaved plates 452b to selectively transfer torque therebetween and, ultimately, between the primary output shaft 406 and the secondary output shaft with the friction coupling. For further discussion of the plate clutch 452 and operation thereof, refer to the discussions of the plate clutches 252, 352 above. Still further details of the plate clutch 452 are discussed below.

The secondary torque locking mechanism 430 generally includes a locking sleeve 432 (e.g., ring, collar, hub), a fork 434 (e.g., shift fork), and a shaft assembly 436 (e.g., slide shaft, shift shaft). The locking sleeve 432 works in conjunction with plate clutch 452 to positively couple the primary output shaft 406 to the sprocket 450 and, thereby, the secondary output shaft to selectively transfer torque therebetween with a positive coupling. More particularly, while the apply plate 452c is coupled to and rotates with the primary output shaft 406 and the clutch housing 452a is fixedly coupled to the sprocket 450 to rotate therewith, the locking sleeve 432 selectively positively couples the apply plate 452c to the clutch housing 452a. Therefore, by positively coupling the apply plate 452c to the clutch housing 452a, the locking sleeve 432 positively couples or locks the primary output shaft 406 to the sprocket 450 and ultimately to the secondary output shaft to transfer torque therebetween.

The locking sleeve 432 is supported by and slides axially along an outer surface 452h (e.g., on a forward end) of the housing 452a of the clutch 452 between a first or disengaged position (shown in FIG. 6A; e.g., a forward position) and a second or engaged position (shown in FIGS. 6B and 6C; e.g., a rearward position). For example, the locking sleeve 432 may have an inner diameter that is slightly larger than an outer diameter of the outer surface 452h of the clutch housing 452a, such that the locking sleeve 432 surrounds and may slide on the forward end of the clutch housing 452a.

Referring to FIG. 6C, the locking sleeve 432 is non-selectively coupled to the housing 452a of the plate clutch 452 and is selectively coupleable to the apply plate 452c to form the positive coupling. For example, the locking sleeve 432 includes circumferentially-spaced teeth or splines 432a (e.g., sleeve teeth) that non-selectively couple the locking sleeve 432 to the clutch housing 452a and selectively couple the locking sleeve 432 to the apply plate 452c. The splines 432a are received (e.g. protrude radially inward through) and slide within complementary (e.g., equally spaced) slots 452e (e.g., housing slots) defined between circumferentially-spaced teeth or splines 452d of the clutch housing 452a (e.g., housing teeth). As the splines 432a of the locking sleeve 432 slide within the slots 452e of the housing 452a, the splines 432a of the locking sleeve 432 are also selectively received in complementary slots 452g (e.g., plate slots) of the apply plate 452c. The splines 432a, thereby, slide into engagement with apply plate 452c to selectively couple the locking sleeve 432 to the apply plate 452c (e.g., to form a positive coupling between the housing 452a and the apply plate 452c). The slots 452g of the apply plate 452c are defined between circumferentially-spaced teeth or splines 452f (e.g., plate teeth) of the apply plate 452c.

To facilitate receipt of the splines 432a of the locking sleeve 432 in the slots 452g between the splines 452f of the apply plate 452c, the splines 432a of the locking sleeve 432 and/or the plate splines 452f may include or form tapered leads at engaging ends thereof (i.e., rearward and forward ends, respectively). While the splines 432a and 452f have generally constant widths and spacing therebetween, the tapered leads are formed by the splines 432a and 452f tapering toward an end that has a narrower width than the remainder of the splines 432a and 452f. The narrower ends of the splines 432a and 452f lessen a range of relative rotational positions between the locking sleeve 432 and the apply plate 452c in which the ends of the splines 432a and 452f might directly engage each other and prevent axial receipt of each other therebetween (i.e., a blocked shift event).

In the first position (i.e., forward or disengaged position), the locking sleeve 432 is engaged with the housing 452a but is disengaged from the apply plate 452c, such that the positive coupling is not formed. The sleeve splines 432a are positioned in the housing slots 452e (i.e., between the housing splines 452d), such that the locking sleeve 432 rotates with the clutch housing 452a. In particular, the sleeve splines 432a are positioned in the housing slots 452e and engage the housing splines 452d in a tangential direction to transfer torque between the housing 452a and the locking sleeve 432. The sleeve splines 432a are positioned forward of the plate slots 452g and out of engagement with the plate splines 452f, thereby allowing the apply plate 452c and primary output shaft 406 to rotate independent of the locking sleeve 432 and the housing 452a.

When the apply plate 452c is biased rearward to compress the interleaved plates 452b, the locking sleeve 432 may remain in the first axial position about the housing 452a and disengaged from the apply plate so as to not form the coupling, or may alternatively move rearward with the apply plate 452c, while still maintaining axial spacing to be disengaged from the apply plate 452c.

In the second position (i.e., rearward or disengaged position), the locking sleeve 432 remains engaged with the housing 452a and additionally engages the apply plate 452c to form the positive coupling. In the second position, the locking sleeve 432 generally surrounds the apply plate 452c with the housing 452a being positioned therebetween. The sleeve splines 432a extend radially inward through the housing slots 452e of the housing 452a (i.e., between the housing splines 452d) and into the plate slots 452g of the apply plate 452c (i.e., between the plate splines 452f). Thus, rotation of the primary output shaft 406 rotates the apply plate 452c whose plate splines 452f engage the sleeve splines 432a in a tangential direction to cause rotation of the locking sleeve 432. This rotation of the sleeve in turn causes the sleeve splines 432a to engage the housing splines 452d in a tangential direction to cause rotation of the housing 452a and the sprocket 450 coupled thereto.

The locking sleeve 432 and the plate clutch 452 may be configured, so as to only provide a positive coupling (i.e., via the locking sleeve 432) or friction coupling (i.e., via conventional operation of the plate clutch 452) at a time. For example, the friction coupling is formed with the plate clutch 452 in a first mode of operation. The positive coupling is formed with the secondary torque locking mechanism 430 in a second mode of operation. The positive coupling is not formed in the first mode, and the friction coupling is not formed in the second mode. For example, the locking sleeve 432 is provided with a relatively short range of travel, which is sufficient for the locking sleeve 432 to engage and disengage the apply plate 452c while the apply plate 452c disengaged from the interleaved plates 452b (i.e., in the forwardmost position of the apply plate 452c). For example, the housing slots 452e and/or actuation system 461 may provide travel of locking sleeve 432 that is approximately equal to or slightly greater an axial length of the sleeve splines 432a and/or the plate splines 452f.

According to other embodiments, the locking sleeve 432 and the plate clutch 452 may be configured to provide simultaneous positive coupling and friction coupling. For example, the friction coupling is formed with the plate clutch 452 in a first mode of operation. The positive coupling is formed with the secondary torque locking mechanism 430 in a second mode of operation in which the friction coupling is also formed. The positive coupling may not be formed in the first mode. The locking sleeve 432 is provided with a relatively long range of travel, which is sufficient for the locking sleeve to disengage the apply plate 452c while the apply plate 452c is in its forwardmost position and to engage the apply plate 452c while the apply plate 452c in its rearmost position fully compressing the interleaved plates 452b. For example, the housing slots 452e may provide travel approximately equal to the travel of the apply plate 452c plus the axial length of the sleeve splines 432a and/or the plate splines 452f.

The fork 434 and shaft 436 are cooperatively configured to move the locking sleeve 432 axially between the first and second positions, for example, by the actuation system 461 as discussed below. According to other exemplary embodiments, a separate or different actuation system may be provided to move the locking sleeve 432, which may or may not include the fork 434, the shaft 436, or the actuation system 461 as described below.

The shaft 436 (e.g., shaft assembly) is coupled to the locking sleeve 432 with the fork 434. The shaft 436 comprises one or more elongated members, which are configured to slide within forward and rearward recesses 402a, 402b of the transfer case 400. A first end of the fork 434 is coupled to the shaft assembly 436 and a second end of the fork 434 engages the locking sleeve 432 (e.g., by having a flange positioned within a peripheral channel 432b of the locking sleeve 432). Thus, as the shaft assembly 436 moves axially in the recesses 402a, 402b of the transfer case housing 402, the fork 434 moves the locking sleeve 432 axially between the first (i.e., disengaged) and second (i.e., disengaged) positions.

In one example, the shaft 436 is configured as an axially compressible shaft assembly 436. The shaft assembly 436 includes a forward shaft member 436a, a rearward shaft member 436e coupled to the fork 434, and a spring 436c positioned therebetween, which enable the shaft assembly 436 to compress axially upon occurrence of a blocked shift event. A blocked shift event may occur when ends of the sleeve splines 432a engage ends of the plate splines 452f of the apply plate 452c, rather than slide into the plate slot 452g therebetween. To overcome the blocked shift event, the sprocket 450 rotates relative to the primary output shaft 406 to bring the slots between the splines into alignment, and the spring 436c, which is in a compressed state, then forces the rearward shaft member 436e rearward to insert the sleeve splines 432a of the locking sleeve 432 into the slots 452g of the apply plate 452c. Alternatively, the shaft assembly 436 may be configured to provide axial compliance in a different manner, or be provided as rigid member that does not compress axially.

The shaft 436 and, thereby, the locking sleeve 432 are moved by a spring 436d and the actuation system 461. The spring 436d biases the locking sleeve 432 toward the first position. The spring 436d is positioned in the rearward recess 402b of the housing 402 and engages an end of the shaft assembly 436 and, thereby, the locking sleeve 432 forward into the first or disengaged position. To move the shaft 436 axially rearward into the second or engaged position, the shaft 436 includes a follower arm 436b that functions as a follower along the rear surface 496a (e.g., member) of the gear plate 496 of the drive gear assembly 490 (i.e., part of the actuation system 461). The rear surface 496a of the gear plate 496 functions as a face cam, which includes a central dwell or flat surrounded by one or more advance movement regions with helically ramped surfaces. The dwell region of the gear plate 496 is engaged by the follower arm 436b during stages of rotation of the actuation system 461 in which no movement of the locking sleeve 432 is required (e.g., first stage for operating the gear reduction mechanism and/or a second stage for conventionally operating the plate clutch 452 with the secondary torque actuator mechanism 470, which is configured as another face cam; refer to actuation system 361 above). The movement advance regions are engaged by the follower arm 436b during stages of rotation (e.g., an additional 10-40 degrees of the actuation system 461) in which movement of the locking sleeve 432 is required. Thus, the actuation system 461 operates the plate clutch 452 and the locking sleeve 432 in different stages of rotation.

Use of the plate clutch 452 (i.e., to form the friction coupling) and/or locking mechanism 430 (i.e., to form the positive coupling) may be dependent on a selected drive ratio of the gear reduction mechanism 410. For example, the transfer case 400 may be configured to utilize the secondary torque transfer mechanism 451 conventionally (i.e., by compressing clutch 452) and also the secondary torque locking mechanism 430 in both high and low drive ratios. In this case, the gear reduction mechanism is operated during the first stage of rotation in both directions (i.e., first positive stage and first negative stage) of the actuation system 461, and the secondary torque transfer mechanism 451 is operated during the second stage of rotation in both directions (i.e., second positive stage after the first positive stage, and second negative stage after the first negative stage) (refer to discussion of the actuation system 361 above). The secondary torque locking mechanism 430 is subsequently operated during a third stage of rotation in both directions (i.e., third positive stage after the second positive stage, and third negative stage after the second negative stage) with the gear plate 496 having advance movement regions that engage the follower arm 436b in the third positive and third negative stages, respectively. In this configuration, the clutch housing 452a may be configured to provide the locking sleeve 432 with relatively long range of movement to disengage the apply plate 452c at its forwardmost position and to engage the apply plate 452c at its rearmost position (e.g., the housing slots 452e may have a relatively long length, as discussed above).

The transfer case 400 may instead be configured to utilize the secondary torque transfer mechanism 451 in both drive ratios to form a friction coupling, but the secondary torque locking mechanism 430 in only one drive ratio (e.g., high or low). In this case, the secondary torque locking mechanism 430 is operated by the actuation system 461 in a third stage of rotation in only one direction (e.g., a third negative stage after the second negative stage) with the gear plate 496 having only one advance movement region that engages the follower arm 436b in the third negative stage. In this configuration, the clutch housing 452a may be configured to provide the locking sleeve 432 with relatively long range of movement to disengage the apply plate 452c at its forwardmost position and to engage the apply plate 452c at its rearmost position (e.g., the housing slots 452e may have a relatively long length, as discussed above).

The transfer case 400 may instead be configured to utilize the secondary torque transfer mechanism 451 conventionally (i.e., by compressing the clutch 452) in only one drive ratio (e.g., high or low) and the secondary torque locking mechanism in only the other drive ratio (e.g., low or high). In this case, the secondary torque transfer mechanism 451 is operated by the actuation system 461 in a second stage of rotation in only one direction (e.g., a second positive stage after the first positive stage), for example, with the secondary torque actuator mechanism 470 or drive gear assembly 490 having an advance movement region (refer to discussion of actuator mechanism 370 and hub 394 above) and the gear plate 496 having a dwell region (i.e., engaged by the follower arm 436b) associated with the second positive stage. The secondary torque locking mechanism 430 is operated by the actuation system 461 in a second stage of rotation in the opposite direction (e.g., a second negative stage after the first negative stage, also referred to as a third stage) with the gear plate 496 having an advance movement region (i.e., engaged by the follower arm 436b) and the secondary torque actuator mechanism 470 or drive gear assembly 490 (refer to hub 394 of drive gear assembly 390 above) having a dwell region associated with the second negative stage. In this configuration, the clutch housing 452a may be configured to provide the locking sleeve 432 with relatively little range of movement to engage/disengage the apply plate 452c only when it is in its forwardmost position (e.g., the housing slots 452e may have a relatively short length, as discussed above).

According to other exemplary embodiments, the transfer case 400 may be configured in other manners. For example, a secondary torque transfer actuator mechanism 480 may include a retreat movement region coinciding with or preceding the advancing of the follower arm 436b, so as to slightly decompress the plate clutch 452 to allow relative rotation for aligning the sleeve splines 432a with the slots 452g of the apply plate 452c. One of the reduction gears (refer to gear 366) of the actuation system 461 may be configured as a face cam for engaging the follower arm 436b (as opposed to the gear pate 496). The actuation system 461 may also be configured to not actively engage the locking mechanism 430 (i.e., by rotating the drive gear assembly 490) during motion of the vehicle, since a binary coupling is provided between the apply plate 452c and the clutch housing 452a, while also being configured to actively engage the plate clutch 452 during motion of the vehicle, since the plate clutch 452 provides gradual or slip coupling. According to still other embodiments, the transfer case 400 may omit the gear reduction mechanism 410, and/or operate the gear reduction mechanism 410 and secondary torque transfer mechanism 451 mechanically independent (i.e., with another actuation system) of the secondary torque locking mechanism 430.

Figure 7A:
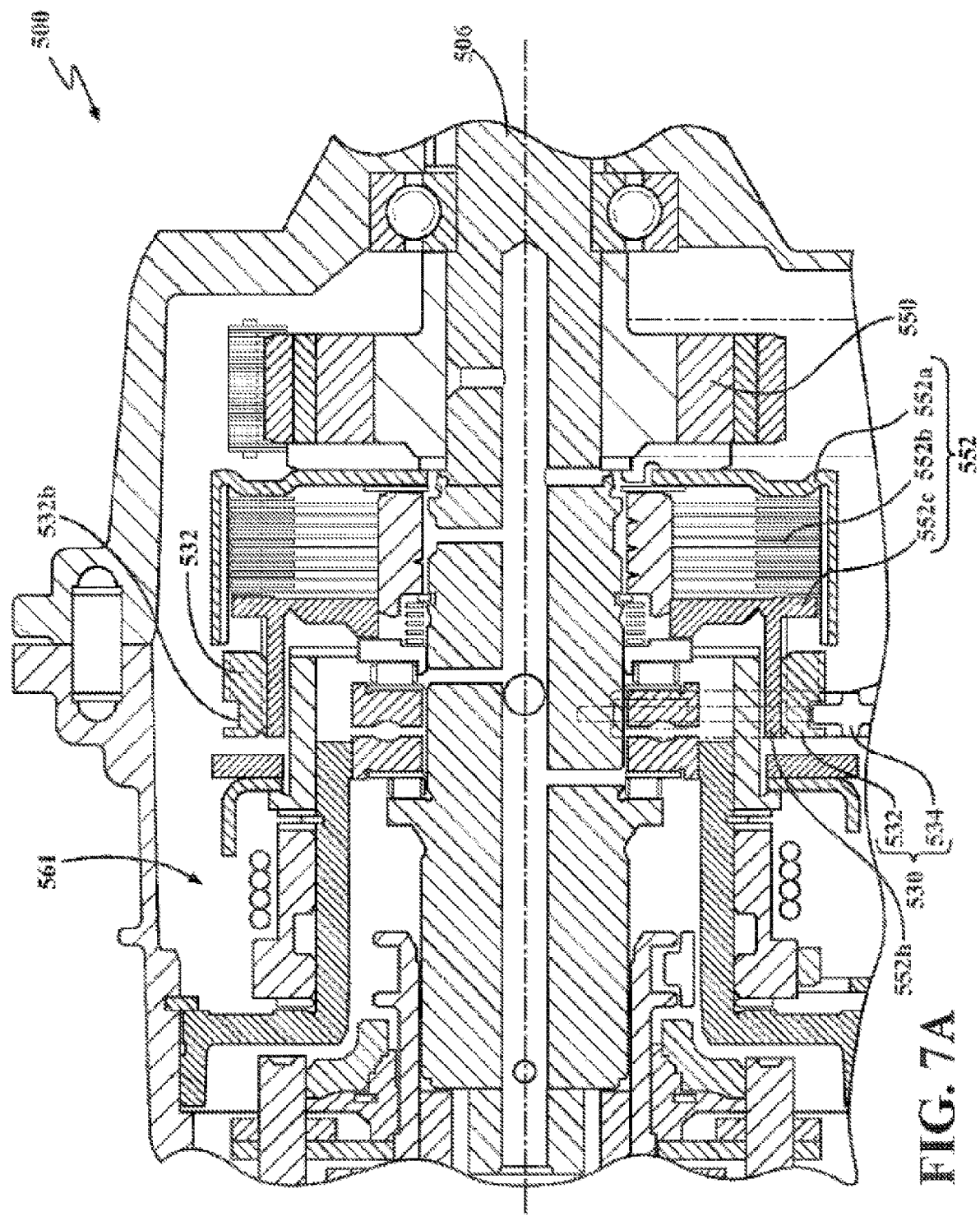
FIG. 7A is a cross-sectional view of a transfer case according to another embodiment, which is shown in a first configuration.
Figure 7B:
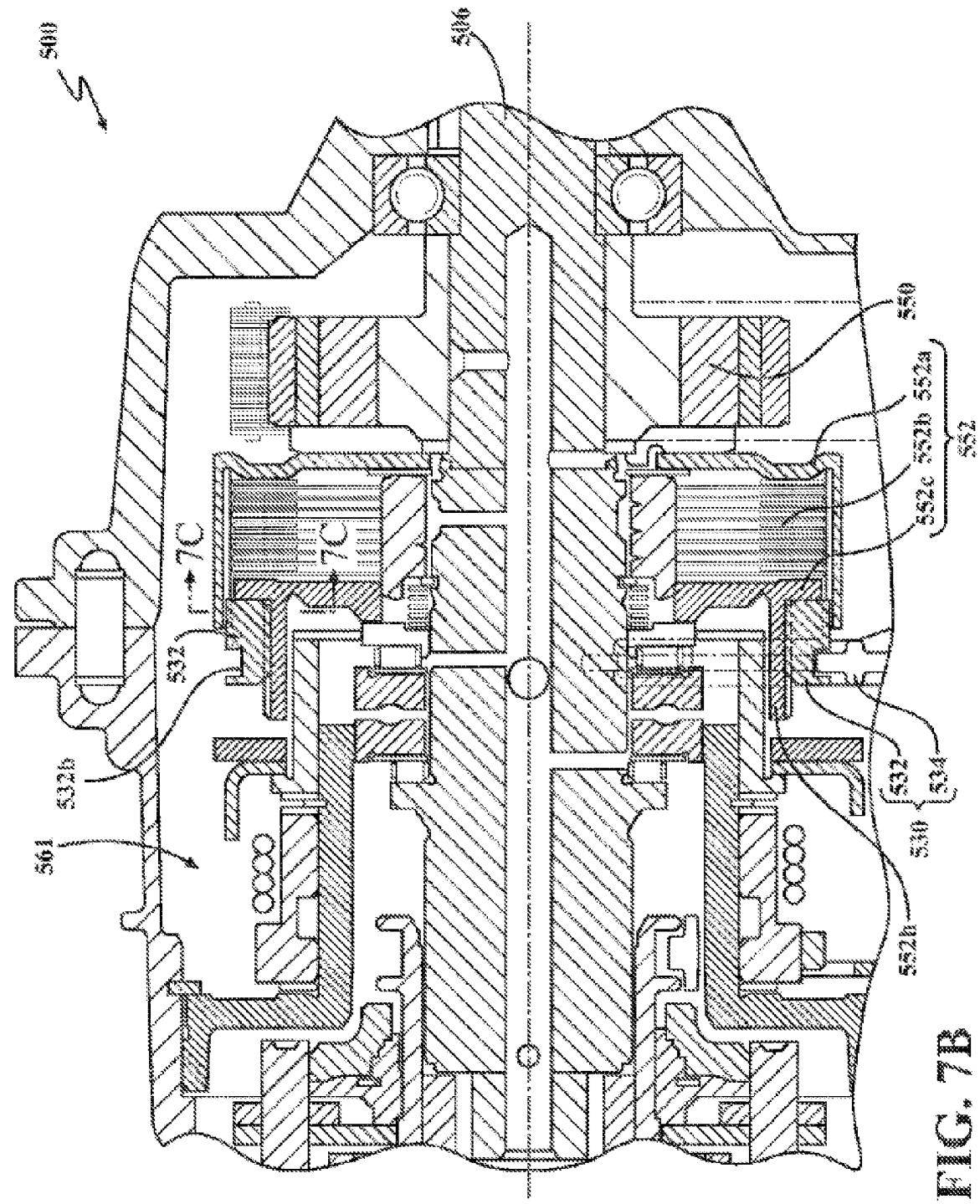
FIG. 7B is a cross-sectional view of the transfer case of FIG. 7A shown in a second configuration.
Figure 7C:
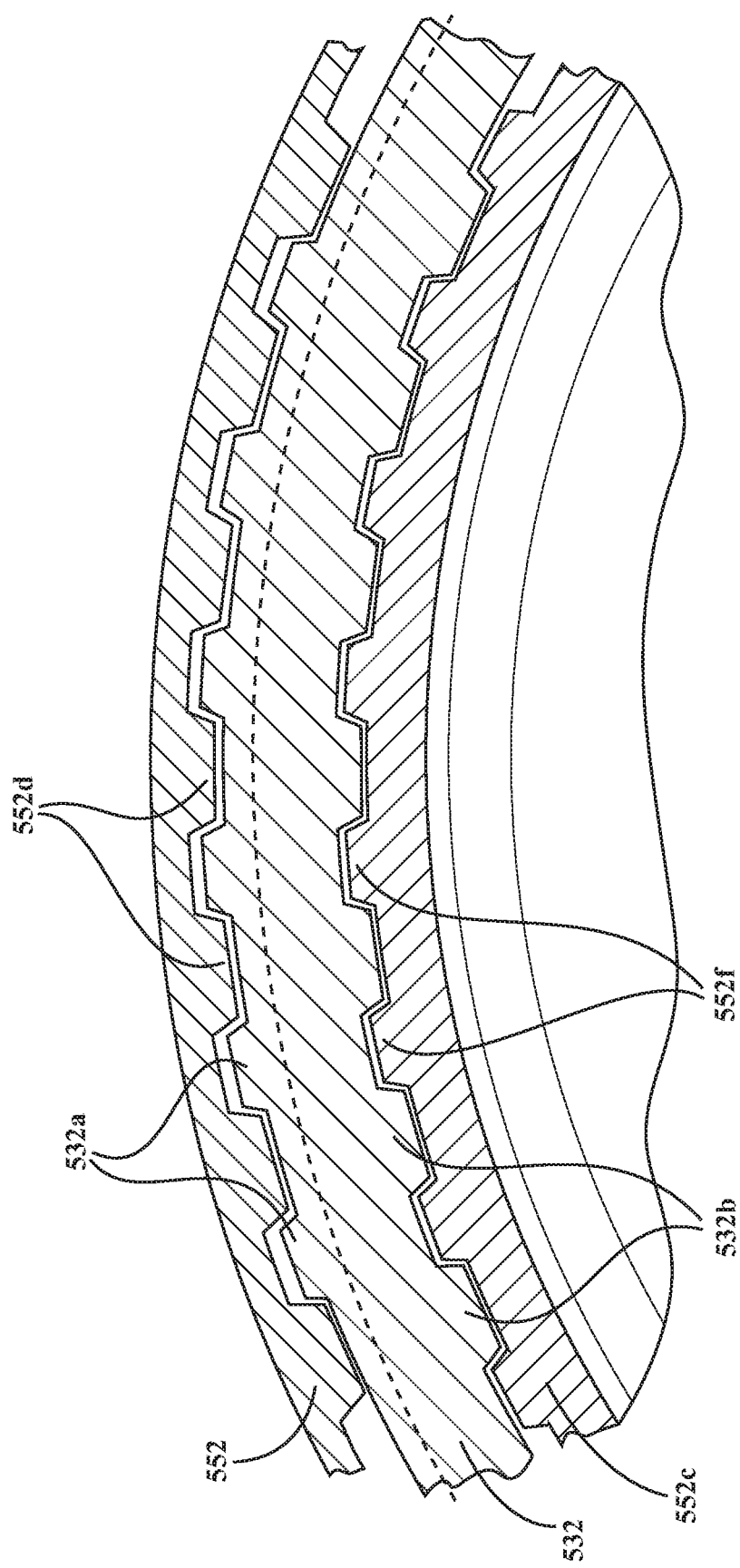
FIG. 7C is a partial perspective view of the transfer case in the configuration shown in FIG. 7B.

According to another exemplary embodiment shown in FIGS. 7A-7C, a transfer case 500 is configured similar to transfer case 400 (refer to transfer cases 300 and 400), but instead includes a secondary torque locking mechanism 530 having a locking sleeve 532 that is instead supported on an outer surface of a forwardly extending portion 552h (e.g., forward end, annular member, etc.) of the apply plate 552c (as opposed to the locking sleeve 432 being supported on a forward portion of the clutch housing 452a).

A plate clutch 552 generally includes a housing 552a, interleaved plates 552b, and the apply plate 552c, which are configured to form the friction coupling in the manner described previously (refer to clutch 452). The locking sleeve 532 is non-selectively coupled to the apply plate 552c, and selectively coupleable to the housing 552a to form the positive coupling. For example, the locking sleeve 532 slides axially between a first or disengaged position (FIG. 7A; e.g., a rearward position) and a second or engaged position (shown in FIGS. 7B and C; e.g., a rearward position). For example, the locking sleeve 532 may have an inner diameter, which is slightly larger than the forward portion 552h of the apply plate 552c, such that the locking sleeve 532 surrounds and may slide on the forward portion 552h of the apply plate 552c. The locking sleeve 532 includes outer circumferentially-spaced teeth or splines 532a (e.g., outer sleeve teeth) that extend radially outward to be received between circumferentially-spaced teeth or splines 552d of the housing 552a (e.g., housing teeth that define slots therebetween). The outer splines 532a selectively couple the locking sleeve to the housing 552a. The locking sleeve 532 also includes inner circumferentially-spaced teeth or splines 532b (e.g., inner sleeve teeth) that extend radially inward and are positioned between circumferentially-spaced teeth or splines 552f of the apply plate 552c (e.g., plate teeth). The inner splines 532b non-selectively couple the locking sleeve to the apply plate 552c. To facilitate receipt of the outer splines 532a of the locking sleeve 532 between the splines 552d of the housing 552a, the outer sleeve splines 532a and/or the housing splines 552d may include tapered leads (e.g., having a narrowed width at axial positions where the splines 532a, 552d first converge, as shown in FIG. 7C), as described above with respect to transfer case 400.

In the first or disengaged position, the inner splines 532b are positioned between the plate splines 552f, such that the locking sleeve 532 may rotate with the apply plate 552c and the primary output shaft 506. The outer sleeve splines 532a are positioned forward of the housing 552a and out of engagement with the housing splines 552d, thereby being able to rotate independent of the housing 552a.

The plate clutch 552 may also be configured to form a friction coupling between the primary output shaft 506 and the secondary output shaft (not shown; refer to secondary output shaft 308), while the locking sleeve 532 is in the first position and disengaged from the housing 552a. The apply plate 552c is biased rearward to compress the interleaved plates 552b, while the locking sleeve 532 remains held in the first position by the fork 534. Alternatively, the locking sleeve 532 may move rearward with the apply plate 552c while still maintaining axial spacing from the housing 552a.

In the second position, the locking sleeve 532 is positioned rearward, such that the housing 552a generally surrounds the locking sleeve 532 and also the apply plate 552c.

The outer sleeve splines 532a extend radially outward between the housing splines 552d, while the inner splines 532b remain positioned between the plate splines 552f of the forward portion 552h of the apply plate 552c. Thus, rotation of the primary output shaft 506 rotates the apply plate 552c whose plate splines 552f engage the inner splines 532b in a tangential direction to rotate the locking sleeve 532. The outer sleeve splines 532a simultaneously engage the housing splines 552d in a tangential direction to rotate the housing 552a and ultimately the sprocket 550.

The locking sleeve 532 and the plate clutch 552 may be configured to provide only a positive coupling or only a friction coupling between the primary output shaft 506 and the secondary output shaft at a time or may be configured to simultaneously provide both a friction coupling and a positive coupling at a time, as discussed above with respect to the transfer case 400.

The fork 534 is configured to be moved by a shaft (not shown; refer to shaft 436) and actuator system 561 in the same manner as described above for the locking mechanism 430. According to other exemplary embodiments, the locking sleeve 532 may be moved in a different manner (e.g., by a separate actuator).

While the disclosure has been made in connection with what is presently considered to be the most practical and preferred embodiment, it should be understood that the disclosure is intended to cover various modifications and equivalent arrangements.

What is claimed is:

1. A transfer case comprising:
   a primary output shaft;
   a secondary output shaft; and
   a torque transfer mechanism comprising:
      a plate clutch for selectively transferring torque between the primary output shaft and the secondary output shaft, the plate clutch including:
         an apply plate coupled to and rotating with the primary output shaft;
         a housing coupled to and rotating with the primary output shaft; and
         interleaved plates that are alternatingly coupled to the primary output shaft and the housing to rotate therewith, the interleaved plates being compressible by the apply plate to transfer torque between the primary output shaft and the secondary output shaft; and
      a locking sleeve for selectively transferring torque between the apply plate and the housing, wherein the locking sleeve is non-selectively coupled to one of the housing or the apply plate and is selectively coupleable to the other of the housing or the apply plate to transfer torque between the apply plate and the housing.

2. The transfer case according to claim 1, wherein the plate clutch transfers torque between the primary output shaft and the secondary output shaft in a first mode.

3. The transfer case according to claim 2, wherein the locking sleeve transfers torque between the apply plate and the housing in a second mode but not in the first mode.

4. The transfer case according to claim 3, wherein the plate clutch transfers torque between the primary output shaft and the secondary output shaft in the second mode.

5. The transfer case according to claim 1, wherein the locking sleeve is configured to slide axially between a first position and a second position, wherein the locking sleeve is disengaged from the other of the housing or the apply plate in the first position, and the locking sleeve is engaged with the other of the housing or the apply plate in the second position.

6. The transfer case according to claim 5, wherein the locking sleeve includes splines that non-selectively couple the locking sleeve to the one of the housing or the apply plate and that selectively couple the locking sleeve to the other of the housing or the apply plate.

7. The transfer case according to claim 6, wherein the locking sleeve slides axially along an outer surface of the housing, the splines protrude radially inward through slots of the housing, and the splines slide within the slots into engagement with the apply plate as the locking sleeve is moved axially from the first position to the second position to selectively couple the locking sleeve to the apply plate.

8. The transfer case according to claim 6, wherein the locking sleeve slides axially along an outer surface of the apply plate, and the splines include inner splines that non-selectively couple the locking sleeve to the apply plate and outer splines that selectively couple the locking sleeve to the housing.

9. The transfer case according to claim 6, further comprising an actuation mechanism that includes a face cam, a shaft that is biased toward the second position by the face cam, a fork that couples the locking sleeve to the shaft to move therewith, and a spring that biases that shaft toward the first position.

10. The transfer case according to claim 5, further comprising an actuation system, wherein the actuation system operates the plate clutch and operates the locking sleeve in different stages of rotation.

11. The transfer case according to claim 10, further comprising a gear reduction mechanism that is operated by the actuation system in another stage of rotation.

12. The transfer case according to claim 10, wherein the actuation system includes a first face cam for operating the plate clutch, and a second face cam for operating the locking sleeve.

13. The transfer case according to claim 1, further comprising an actuation system, wherein the actuation system operates the plate clutch and operates the locking sleeve in different stages of rotation;
wherein the plate clutch transfers torque between the primary output shaft and the secondary output shaft in a first mode, and the locking sleeve transfers torque between the apply plate and the housing in a second mode but not the first mode;
wherein the locking sleeve is configured to slide axially between a first position and a second position, wherein the locking sleeve is disengaged from the other of the housing or the apply plate in the first position, and the locking sleeve is engaged with the other of the housing or the apply plate in the second position; and
wherein the locking sleeve includes splines that non-selectively couple the locking sleeve to the one of the housing or the apply plate and that selectively couple the locking sleeve to the other of the housing or the apply plate.

14. A transfer case comprising:
a primary shaft;
a secondary shaft; and
a torque transfer mechanism for selectively coupling the primary shaft to the secondary shaft to transfer torque therebetween, the torque transfer mechanism comprising:
a plate clutch including:
an apply plate coupled to the primary shaft to rotate therewith;
a housing coupled to the primary shaft to rotate therewith; and
interleaved plates that are alternatingly coupled to the primary shaft and the housing to rotate therewith and that are compressible by the apply plate to selectively couple the primary shaft to the secondary shaft; and
a locking mechanism that selectively couples the apply plate to the housing to lock the primary shaft to the secondary shaft.

15. The transfer case according to claim 14, wherein the locking mechanism includes a locking sleeve is coupled to one of the housing or the apply plate to rotate therewith, and moves between an engaged position in which the locking sleeve is positively coupled with the other of the housing or the apply plate to lock the primary shaft to the secondary shaft and a disengaged position in which the locking sleeve is not positively coupled with the other of the housing or the apply plate.

16. The transfer case according to claim 15, wherein the locking sleeve slides axially on an outer surface of the one of the housing or the apply plate.

17. The transfer case according to claim 16, wherein the locking sleeve is non-selectively coupled to the housing in the engaged position and the disengaged position.

18. The transfer case according to claim 16, wherein the locking sleeve is non-selectively coupled to the apply plate in the engaged position and the disengaged position.

19. A locking mechanism for a transfer case of a type having a primary shaft and a secondary shaft that are selectively frictionally coupled with a plate clutch including a housing and an apply plate to transfer torque between the primary shaft and the secondary shaft, the locking mechanism comprising:
a locking sleeve coupled to the apply plate of the plate clutch and selectively engageable with the housing of the plate clutch to positively couple the housing to the apply plate to transfer torque therebetween, the locking sleeve defining an inner diameter larger than an outer diameter defined by the apply plate such that the locking sleeve is axially slidable in relation to the apply plate between disengaged and engaged positions.

20. The locking mechanism according to claim 19, further comprising an actuation mechanism that operates the plate clutch and the locking sleeve in different stages of rotation.

* * * * *